United States Patent [19]
Jordan et al.

[11] Patent Number: 5,293,486
[45] Date of Patent: Mar. 8, 1994

[54] DETERMINISTIC METHOD FOR ALLOCATION OF A SHARED RESOURCE

[75] Inventors: Michele A. Jordan, Moate; Diarmiud J. Donnelly, Youghal, both of Ireland

[73] Assignee: Digital Equipment Corporation, Maynard, Mass.

[21] Appl. No.: 724,538

[22] Filed: Jun. 28, 1991

[51] Int. Cl.$^5$ .............................................. G06F 13/00
[52] U.S. Cl. ............................................ 395/200; 395/250
[58] Field of Search .................. 364/DIG. 1, DIG. 2; 395/200, 250, 275; 370/60, 94.1, 58.1, 95.2, 95.3, 95.1

[56] References Cited

U.S. PATENT DOCUMENTS

| Re. 31,319 | 7/1983 | Fraser | 370/80 |
|---|---|---|---|
| 3,755,786 | 8/1973 | Dixon et al. | 340/172.5 |
| 3,796,835 | 3/1974 | Closs et al. | 179/15 BY |
| 4,410,942 | 10/1983 | Milligan et al. | 395/275 X |
| 4,475,192 | 10/1984 | Fernow et al. | 370/94 |
| 4,704,606 | 11/1987 | Hasley | 340/825.5 |
| 4,754,451 | 6/1988 | Eng et al. | 370/60 |
| 4,788,679 | 11/1988 | Kataoka et al. | 370/60 |
| 4,823,108 | 4/1989 | Pope | 340/721 |
| 4,849,968 | 7/1989 | Turner | 370/94 |
| 4,975,952 | 12/1990 | Mabey et al. | 380/49 |
| 4,979,165 | 12/1990 | Dighe et al. | 370/60 |

FOREIGN PATENT DOCUMENTS

| 0088617 | 9/1983 | European Pat. Off. |
| 0442615 | 8/1991 | European Pat. Off. |

OTHER PUBLICATIONS

Patent Abstracts of Japan, vol. 14, No. 452 (P-1112) Sep. 27, 1990 & JP-A-21 81 250 (Fujitsu) Jul. 16, 1990.

*Primary Examiner*—Robert L. Richardson
*Attorney, Agent, or Firm*—Kenyon & Kenyon

[57] ABSTRACT

A method and apparatus for fairly allocating a shared resource among N operating devices of a computer system. The resource allocation is implemented by operating the shared resource to process data for each of the N operating devices in a round robin manner, through a series of time slots. The shared resource processes up to a fixed maximum amount of data during each time slot.

6 Claims, 2 Drawing Sheets

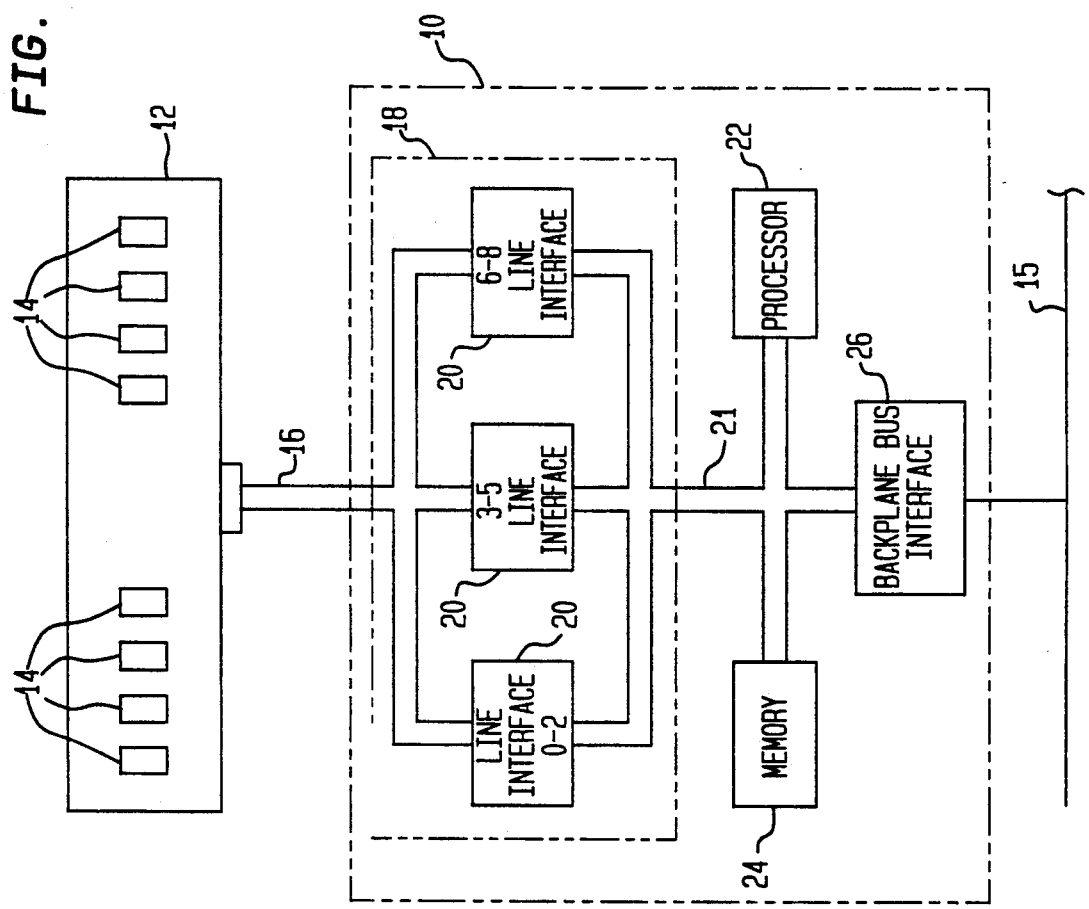

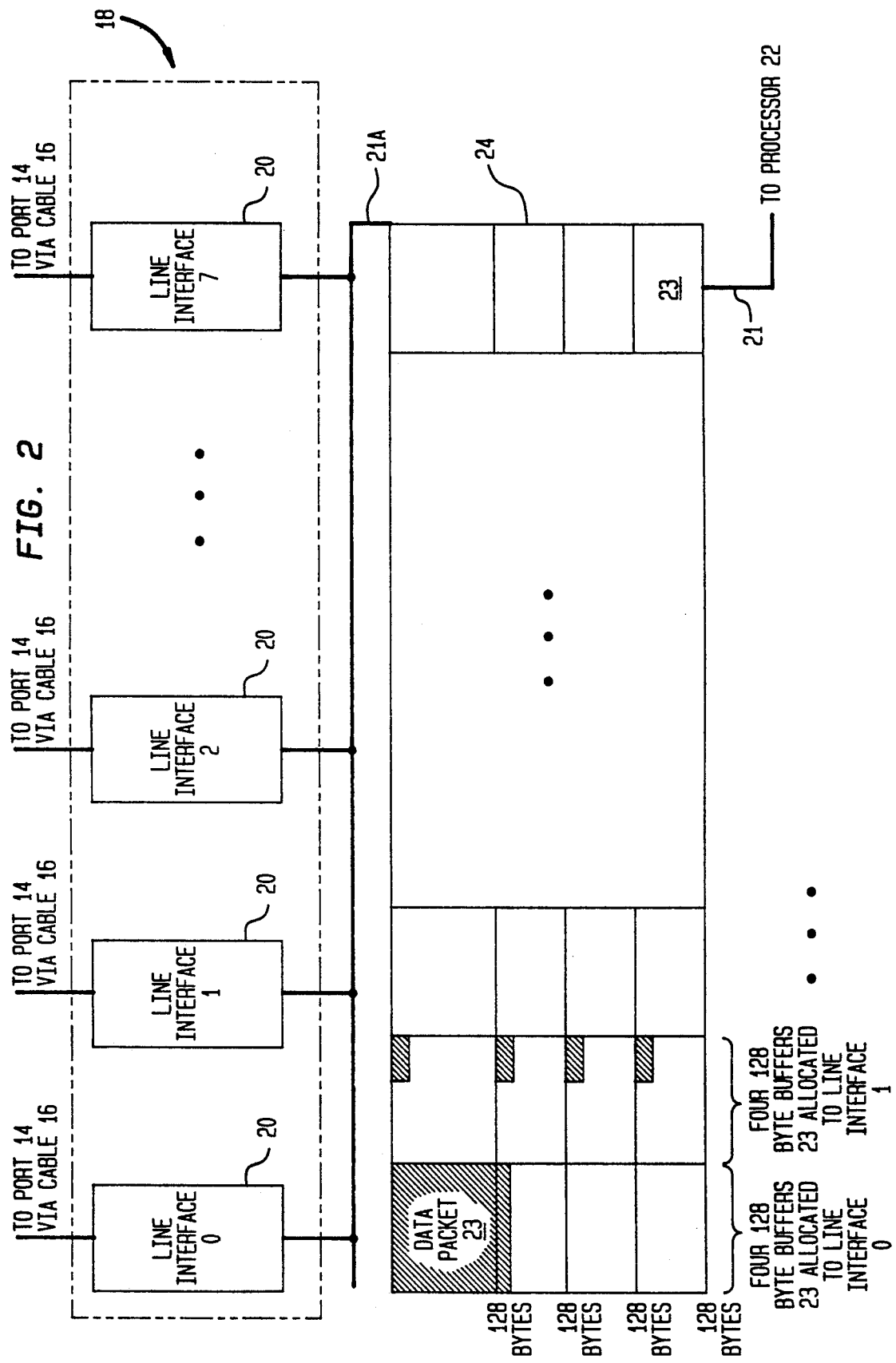

DETERMINISTIC METHOD FOR ALLOCATION OF A SHARED RESOURCE

FIELD OF THE INVENTION

The present invention is directed to a method and apparatus for allocating processing services of a shared resource among a plurality of operating devices of a computer system.

BACKGROUND OF THE INVENTION

Modern computer systems often comprise a plurality of operating devices and a shared resource. The operating devices can comprise, e.g., I/O controllers such as serial communication controllers in a line interface card arranged to couple a plurality of data transmission lines through corresponding modems to a processor. The processor is therefore shared by the communication controllers to process data, typically in the form of data packets, received at or to be transmitted by the serial communication controllers.

In known computer systems, a common memory is used to buffer data packets between the shared processor and the serial communication controllers. The common memory is typically divided into a plurality of buffers and each serial communication controller is allocated a fixed number of buffers for buffering of data packets received at or to be transmitted by the respective serial communication controller. Each data packet is stored in a separate buffer, but a single data packet may be stored in several buffers if its size is larger than the buffer size. The shared processor polls the buffers in a round robin fashion, through a sequence of time slots, to process one buffer per time slot.

However, in many applications, the data packets received at or transmitted by each of the serial communication controllers may vary in size from a few bytes to several bytes in length. The amount of processing time required to process each data packet is approximately proportional to the size of the data packet. A serial communication controller that typically receives relatively large data packets can dominate the use of the shared processor when the processor follows a round robin schedule that fixes the processing of data packets to one buffer per time slot. This is because each relatively large data packet may completely fill one buffer and may even fill more than one buffer. Thus, the shared processor will be required to process a relatively large amount of data during each time slot allocated to the buffers of the serial communication controller receiving relatively large data packets.

A serial communication controller that receives a series of relatively small data packets will, on the other hand, only partially fill each one of several buffers, one data packet per buffer, with only one of its buffers being processed by the shared processor during each round robin polling cycle. The serial communication controller may therefore run out of available buffers before the shared processor can completely process all of the relatively small data packets. Thus, the one buffer per time slot processing scheme typically utilized in computer systems is often deficient in operating environments wherein the amount of data requests to be processed during each scheduled time slot varies greatly from device to device.

SUMMARY OF THE INVENTION

The present invention provides a resource allocation scheme that is deterministic in a manner that assures a fair allocation of a shared resource among a plurality of operating devices of a computer system. According to the present invention, the processing capabilities of the shared resource are allocated among the operating devices such that the shared resource processes at least one buffer per time slot and continues to process data in a second and subsequent buffers allocated to the same operating device during the same time slot, up to a fixed maximum amount of data, e.g. a fixed maximum number of bytes. In this manner, several buffers can be processed in a single time slot when each buffer is used to store a relatively small sized data packet, yet at least one buffer is processed during each time slot for each operating device to achieve an equitable allocation of the shared resource while making progress in the data processing for all of the operating devices.

BRIEF DESCRIPTION OF THE DRAWINGS

FIG. 1 is a block diagram of a line interface card incorporating the resource allocation scheme of the present invention.

FIG. 2 is a block diagram of the line interfaces and common memory of the line interface card of FIG. 1.

DETAILED DESCRIPTION

Referring now to the drawings, and initially to FIG. 1, there is illustrated a low speed synchronous transmission line interface card 10. The line interface card 10 is coupled to a distribution panel 12 provided with eight serial ports 14, each to be coupled to a modem to provide eight separate and independent low speed communication channels for the line interface card 10. The distribution panel 12 supports, e.g., connectivity for one of the V.11/EIA-RS422, V.35 and V.28/EIA-RS-232-D modem control and signalling standards having a range of line speeds of from 1.2 to 64K bps. The ports 14 are coupled by a 50 wire cable 16 to a line interface 18 which comprises three Motorola MC68302 Integrated Multi-Protocol Processors, each of which comprises three line interfaces 20. The MC68302 processors support 16 and 32 bit CRC generation and checking, HDLC and LAPB data link layer protocols and NRZ and NRZI data encoding formats.

The line interface card 10 utilizes a subset of each of the line interface processors 20, namely the three serial communication controllers (SCC) in each processor comprising a line interface 20, for a total of nine SCC facilities. Eight of the SCC's are used for serial communication control, each dedicated to one of the eight ports 14 of the distribution panel 12. The ninth SCC is used to multiplex the modem and module signals required by the line interfaces 20 and the eight modems coupled to the ports 14 across a subset of the wires of the 50 wire cable 16. For example, the multiplexing scheme disclosed in U.S. application Ser. No. 722,686, now U.S. Pat. No. 5,202,884, issued Apr. 13, 1993, entitled MULTIPLEXING SCHEME FOR MODEM CONTROL SIGNALS, filed on even date herewith, can be utilized in the system of the present invention. Application Ser. No. 722,686, is hereby expressly incorporated by reference.

Referring again to FIG. 1, a processor 22 comprises a Texas Instrument TMS320C25 processor and is the main processing engine on the card 10.

The eight interfaces 20 provided by the SCC's of the MC68302 processors can, at any one time, receive and/or transmit up to sixteen different data packets simultaneously. Accordingly, the processor 22 is a single, high speed resource that is shared by the eight low speed line interfaces 20 supported by the line interface card 10. The processor 22 must be able to process data packets faster than the total packet arrival/transmit rate through the eight line interfaces 20. The processor 22 is also coupled to a backplane bus interface 26 through the bus system 21 for coupling to a backplane bus 15. The backplane bus 15 can be used to couple the line interface card 10 to a computer system (not illustrated).

Pursuant to a feature of the present invention, a common memory 24 is provided on the line interface card 10 to buffer data packets between the shared processor 22 and the eight line interfaces 20 (see FIG. 1). The line interfaces 20, memory 24 and processor 22 are coupled together by a bus system 21.

The memory 24 is divided into a plurality of buffers 23 and each interface 20 is allocated a fixed number of buffers 23 for buffering of data packets received at or to be transmitted from the respective line interface 20. For example, each line interface 20 can be allocated four 128 byte capacity buffers 23, as illustrated in FIG. 2. The line interfaces 20 are coupled to the common memory 24 for packet read and write access by a bus 21A of the bus system 21.

An arbitration scheme is implemented to arbitrate between the line interfaces 20 for access to the bus 21A so that the interfaces can read and write data packets over the bus to the respective allocated buffers in the memory 24. For example, the arbitration scheme disclosed in U.S. application Ser. No. 723,055, now U.S. Pat. No. 5,148,112, issued Sep. 15, 1992, entitled EFFICIENT ARBITER, filed on even date herewith, can be utilized to efficiently arbitrate between the line interfaces 20 for access to the shared common memory 24. Application Ser. No. 723,055 is hereby expressly incorporated by reference.

During the operation of the line interface card 10, each line interface 20 of the line interface card 10 can receive or transmit individual data packets that vary in size from, e.g., 4 bytes to several thousand bytes. Accordingly, multiple 128 byte buffers may be required to store a single data packet. Each line interface 20 and the processor 22 are arranged to "chain" several of the buffers 23 to one another when required to store a data packet having more bytes than the 128 byte buffer capacity, as illustrated in FIG. 2 by the cross-hatching in the packet example for the buffer region allocated to line interface 0. On the other hand, a series of small packets, each having a number of bytes less than the buffer capacity, are each placed in a separate buffer 23, as illustrated in FIG. 2 by the cross-hatching in the packet example for the buffer region allocated to the line interface 1.

The amount of processing time required by the shared processor 22 for each data packet is approximately proportional to the number of bytes in the data packet. Thus, when data packets of varying sizes are received in or transmitted from the various line interfaces 20, those line interfaces 20 regularly receiving or transmitting relatively large packets can dominate the use of the shared processor 22.

To assure an equitable distribution of the processing resource, the present invention provides a deterministic scheduling scheme to service the data packets for each of the line interfaces 20. Pursuant to a feature of the present invention, the processor 22 is scheduled to service the buffers 23 allocated to each line interface 20 on a round robin basis, in a series of processing time slots, one time slot for each line interface 20. During each time slot, the processor 22 processes a data packet or portion of a data packet stored in at least one buffer 23 of the respective line interface 20.

Processing of data packets or portions of data packets stored in a second and subsequent buffers 23 allocated to the respective line interface 20 during the same time slot is continued or postponed as a function of the number of bytes processed during the time slot, as measured at the end of processing of each buffer 23. Each scheduled processing time slot for each line interface 20 is limited to a fixed maximum number of receive or transmit bytes. The maximum number of bytes is called a threshold value and is related to the buffer size. For example the threshold value for 128 byte buffers can be set at 128 or more bytes.

An account of the number of transmit and received bytes processed in the current time slot is maintained by the processor 22. After the processing of, e.g., a received data packet stored in a first buffer, the processor 22 will compare the number of bytes processed in the first buffer with the threshold value and determine the number of additional bytes that can be processed during the current time slot. If the number of bytes processed in the first buffer equals or exceeds the threshold value, the processor will move on to the next time slot and begin to process the buffers 23 allocated to the next line interface 20. However, if the number of bytes processed in the first buffer does not equal or exceed the threshold value, the processor 22 will read the size of the data packet in the next buffer 23 from the corresponding line interface 20.

When the number of bytes stored in the next buffer 23 is less than the number of additional bytes that can be processed during the current time slot, the processor 22 will proceed to process the next buffer. Otherwise, the processor 22 will move on to the next time slot. As should be understood, the processor 22 will continue to process buffers until the number of bytes in a next buffer equals or exceeds the number of additional bytes that the processor 22 can process in the current time slot. Any data packets not processed during a time slot will be processed during the next time slot for the respective line interface 20 according to the round robin scheme.

Similarly, on transmit of data packets, the processor 22 will process and transmit at least one buffer size number of bytes. Further transmit processing will proceed to a next buffer only if the number of bytes for the next buffer does not equal or exceed the difference between the number of bytes already processed during the time slot and the threshold value.

An example of the operation of the resource allocation scheme of the present invention will now be described with reference to FIG. 2. Line interface 0 has received a 140 byte data packet that is stored in two "chained" buffers 23, as illustrated by cross-hatching, with 128 bytes stored in a first buffer 23 and the remaining 12 bytes stored in a second buffer 23. In addition, four 4 byte data packets have been received by line interface 1 and stored in four different buffers 23, also as illustrated by cross-hatching.

During the time slot dedicated to line interface 0, the processor 22 will read and process the bytes stored in the first buffer 23 allocated to line interface 0. After the completion of processing of the bytes of the first buffer 23, the account of bytes processed maintained by the processor 22 will equal 128. Thus, the threshold of 128 bytes has been equaled and the processor will move on to process the buffers 23 allocated to line interface 1. The 12 bytes stored in the second buffer allocated to line interface 0 will be processed when the processor 22 has completed a time slot for each of the line interfaces of the line interface card 10 and begins another round robin of time slots.

During the time slot dedicated to line interface 1, the processor 22 will read and process the bytes stored in the first buffer 23 allocated to line interface 1. After completion of processing of the bytes of the first buffer, the account of bytes processed during the time slot dedicated to line interface 1 will equal 4. Thus, the processor 22 can process up to 124 more bytes during the current time slot. Accordingly, the processor 22 will proceed to process the bytes of the second buffer 23 and continue to process the third and fourth buffers inasmuch as the total number of bytes processed for all four buffers of the line interface 1 equals 16, far below the 128 byte threshold. When the processor 22 runs out of buffers to process during a time slot without reaching the threshold, the processor 22 moves on to the buffers of the next line interface.

The resource allocation scheme of the present invention is deterministic because several factors relating to the operation and the data traffic patterns of the network can be determined and used to set the number and size of buffers in the memory 24 and the threshold value. The time it takes the processor 22 to process an entire loop of buffers in the round robin processing can be determined to establish the number of buffers that can be allocated to each line interface without causing an overflow of buffers allocated to any one line interface before the processor returns to that line interface. Accurate estimates of buffering can be made so as to provide sufficient time for the processor 22 to handle data traffic through each port and return to the port before the buffers for that port are full. A maximum amount of bytes per time slot can be assumed for a worst case calculation of the time it would take the processor 22 to process a full loop of time slots. This value can be compared to the amount of receive and transmit bytes through the line interfaces during that amount of time to determine the adequacy of the number and size of buffers and the threshold value for the scheduling scheme.

The scheduling scheme of the present invention provides an equitable allocation of the shared processing resource available to the line interfaces 20 so that the high speed processor 22 can efficiently and reliably process data packet traffic through the eight communication channels supported by the line interface card 10. In this manner, the processing required to be performed by the processor 22 can be accomplished for all of the line interfaces without overflow of buffers allocated to any one or more of the low speed transmission line interfaces 20.

What is claimed is:

1. A method for allocating a shared resource among N operating devices in a computer system, the method comprising the steps of:
    providing a plurality of buffers;
    allocating preselected sets of the plurality of buffers to the N operating devices, one of the preselected sets of the plurality of buffers being allocated to one of the N operating devices for the storage of data relating to the respective one of the N operating devices;
    operating the shared resource to poll the plurality of buffers in a round robin scheme, through a series of time slots, for processing of data stored in the plurality of buffers; and
    operating the shared resource during each time slot to process data stored in at least one buffer of one of the preselected sets of buffers and to continue to process data in a second and subsequent buffers of the one of the preselected sets of buffers so long as the total amount of data processed in the time slot is less than a predetermined maximum amount of data.

2. The method of claim 1 wherein the predetermined maximum amount of data is measured in a maximum total amount of bytes of data.

3. The method of claim 1 wherein the step of operating the shared resource during each time slot is performed by maintaining an account of the amount of data processed during the time slot, reading the amount of data stored in a next buffer to be processed during the time slot, comparing the amount of data stored in the next buffer to the difference between the predetermined maximum amount of data and the current value of the account and continuing to process the data in the next buffer when the amount of data stored in the next buffer is less than the difference.

4. The method of claim 3 wherein the step of maintaining an account is performed by summing the total amount of data processed during the time slot at the completion of processing of data in each buffer.

5. The method of claim 1 wherein the shared resource comprises a processor.

6. The method of claim 1 wherein each of the N operating devices comprises a serial communication controller.

* * * * *